United States Patent
Jameson et al.

(10) Patent No.: US 6,827,043 B2
(45) Date of Patent: Dec. 7, 2004

(54) INSULATED PROBE

(75) Inventors: James L. Jameson, Knoxville, TN (US); Steve Fleetwood, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 10/345,496

(22) Filed: Jan. 16, 2003

(65) Prior Publication Data
US 2004/0139928 A1 Jul. 22, 2004

(51) Int. Cl.⁷ .............................................. A01K 15/00
(52) U.S. Cl. ...................................... 119/765; 119/859
(58) Field of Search ................................ 119/859, 765, 119/908; 231/7; 452/58, 60; 340/573.3

(56) References Cited

U.S. PATENT DOCUMENTS

| 5,099,797 A | | 3/1992 | Gonda | |
|---|---|---|---|---|
| 5,207,178 A | * | 5/1993 | McDade et al. | 119/859 |
| 5,471,954 A | * | 12/1995 | Gonda et al. | 119/859 |
| 5,601,054 A | * | 2/1997 | So | 119/718 |
| 5,934,225 A | * | 8/1999 | Williams | 119/859 |
| 6,232,880 B1 | * | 5/2001 | Anderson et al. | 340/573.3 |

* cited by examiner

Primary Examiner—Michael J. Carone
Assistant Examiner—Kimberly S. Smith
(74) Attorney, Agent, or Firm—Pitts & Brittian, P.C.

(57) ABSTRACT

An insulated probe for delivering an effective shock stimulus to an animal regardless of the moisture content of an animal's fur. The insulated probe minimizes the likelihood of unwanted electrical shunting through the wet fur of the animal. The insulated probe includes a two-piece housing allowing for the length of the insulated probe to be easily varied.

16 Claims, 3 Drawing Sheets

INSULATED PROBE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an electronic animal-training device that is carried by an animal. More particularly, this invention pertains to a means for delivering an electroshock stimulus to an animal for behavioral training purposes without compromising effectiveness that may, at times when the animal is wet, be lost due to unwanted electric shunting.

2. Description of the Related Art

In the field of electronic animal training devices, electrodes of opposing charge are placed proximate each other and held in contact with the skin of an animal being trained. These electrodes are connected to a shock stimulus generator. The shock stimulus generator is generally connected to a sensor capable of receiving information pertaining to the timing and type of electroshock stimulus that is to be delivered to the animal that is undergoing training. Transmission of the signal determining the appropriate time to deliver the electroshock stimulus and the type of electroshock stimulus to be delivered is usually achieved via either an automatic transmitter capable of detecting an undesirable behavior of the animal or via a manual transmitter controlled by the animal's instructor.

In conditions of moderate to extreme wetness the coat of the animal undergoing training may become saturated with water. Such scenarios are extremely common when, for example, hunting dogs are trained to retrieve fowl that have been shot above bodies of water or above dew-moistened fields. The wet fur of the animal undergoing training quite often compromises the effectiveness of electronic animal training devices. The water that accumulates on the coat of the animal provides an undesirable alternative pathway of lesser resistance for the low current, high voltage signal used as an electroshock stimulus. Instead of traveling through the animal's skin, the current may merely travel through the water on the animal's coat on its route from the positive cathode probe to the anode probe. Not only does the shunting of electricity reduce the effectiveness of the behavior correcting electroshock stimulus, but electric shunting may also damage the animal's skin that is nearest to the area that the electric shunting occurs.

Insulated probes have previously been used in association with electronic animal training devices. These probes have generally consisted of solid, single-piece, electrically conductive electrodes that attach directly to the training device and transfer the electroshock stimulus to the animal. Probes that are not insulated display greatly reduced effectiveness in conditions where the animal has become wet. Some probes used in conjunction with electronic animal training devices consist of the same solid, single-piece construction, but also utilize insulation over some parts of the probe. This insulation serves to shield parts of the animal other than the skin from the probe. In this way unwanted electrical shunting is reduced.

Typical of the prior art is U.S. Pat. No. 5,099,797, entitled "Electrode Structure for Collar Mounted Animal Training Apparatus," issued to Gerald J. Gonda on Mar. 31, 1992 ("the '797 patent"). The '797 patent discloses an insulated probe including an insulator placed around the body of a electrically conductive electrode leaving only the tip of the electrode exposed. The '797 patent discloses the specific dimensions of the exposed electrode tip that Gonda found to be effective in minimizing current shunting. Gonda offer no disclosure as to the construction and assembly of the insulated probe particularly with thought to resizing the probes.

BRIEF SUMMARY OF THE INVENTION

The present invention is an insulated correction probe for use in association with electronic animal training devices. The insulated probe conducts electricity from a shock stimulus generator to an animal being trained. The electroshock serves as a correction stimulus for the animal being trained and is delivered to the animal via the exposed tip of the insulated probe. The probe's tip is held against the skin of the animal.

A probe housing insulates a portion of the electrode leaving a tip exposed to make electrical contact with the skin of the animal. In this way, current generated for the purpose of providing a stimulus to the animal does not shunt across the fur of the animal to another probe of opposite charge. This would occur if the fur of the animal was wet and therefore provided another pathway of lesser resistance.

An electrically conductive mounting stud and the electrode are molded into two separate pieces of the probe housing. The two portions of the probe housing are secured together to form the insulated probe. The mounting stud and the electrode are electrically connected by a conductor, which is internal to the insulated probe. The conductor is adapted to connect the mounting stud and the electrode regardless of the length of the insulated probe.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for delivering an effective shock stimulus to an animal regardless of the moisture content of the animal's fur, or insulated probe, is shown generally at 10 in the figures. Those skilled in the art will also recognize that for a variety of reasons an animal's fur will frequently become wet. The water on the animal's fur often provides a pathway of lesser resistance between the probes for the current to travel. Shunting results in the reduced effectiveness of the electroshock stimulus. The insulated probe minimizes the likelihood of unwanted electrical shunting through the wet fur of the animal.

Figure 1:
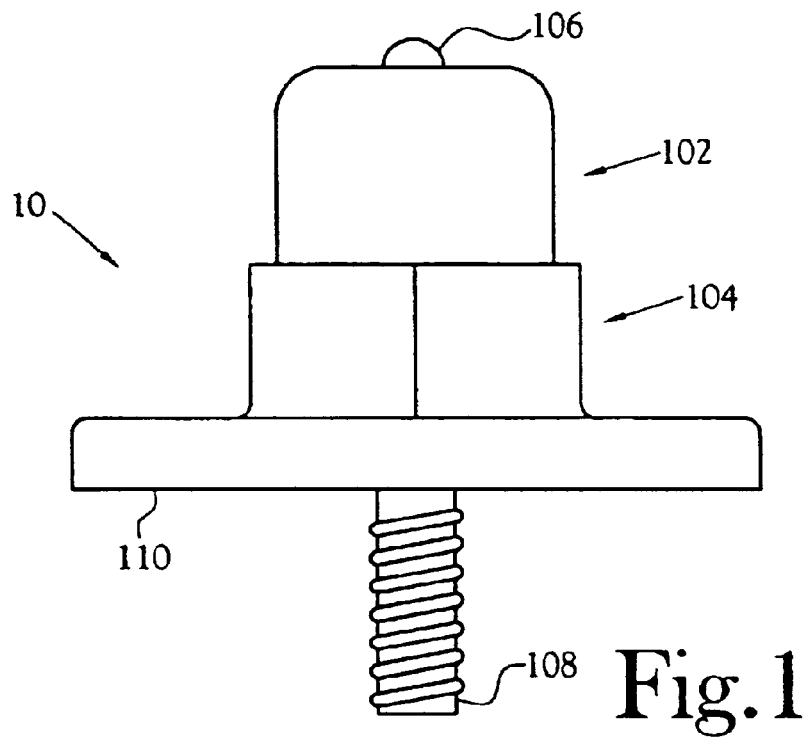
FIG. 1 is a side elevation view of the insulated probe.

FIG. 1 illustrates a side elevation view of the insulated probe 10. In the illustrated embodiment, the insulated probe 10 includes a two-part housing having an upper section, or cap, 102 and a lower section, or barrel 104. An electrode tip 106 extends through an upper opening in the cap 102. Those skilled in the art will recognize other configurations for the housing that can be used without departing from the scope and spirit of the present invention. For example, the housing could be formed from more or fewer parts and the size and shape can be varied.

The barrel 104 includes a mounting stud 108. The mounting stud 108 is a conductor adapted to mechanically secure and electrically connect the insulated probe to the receiver unit (not shown). In the illustrated embodiment, the mounting stud 108 includes a threaded extension extending from an opening in the lower portion of the barrel 104. Those skilled in the art will recognize other configurations adapted to secure the insulated probe 10 to the receiver unit. The barrel 104 of the illustrated embodiment also defines a washer 110 integrated into the lower portion of the barrel 104. The washer 110 prevents the insulated probe 10 from passing through the holes in a strap (not shown) when the receiver unit (not shown) is secured to the strap with the insulated probes, as commonly known to those skilled in the art.

Figure 2:
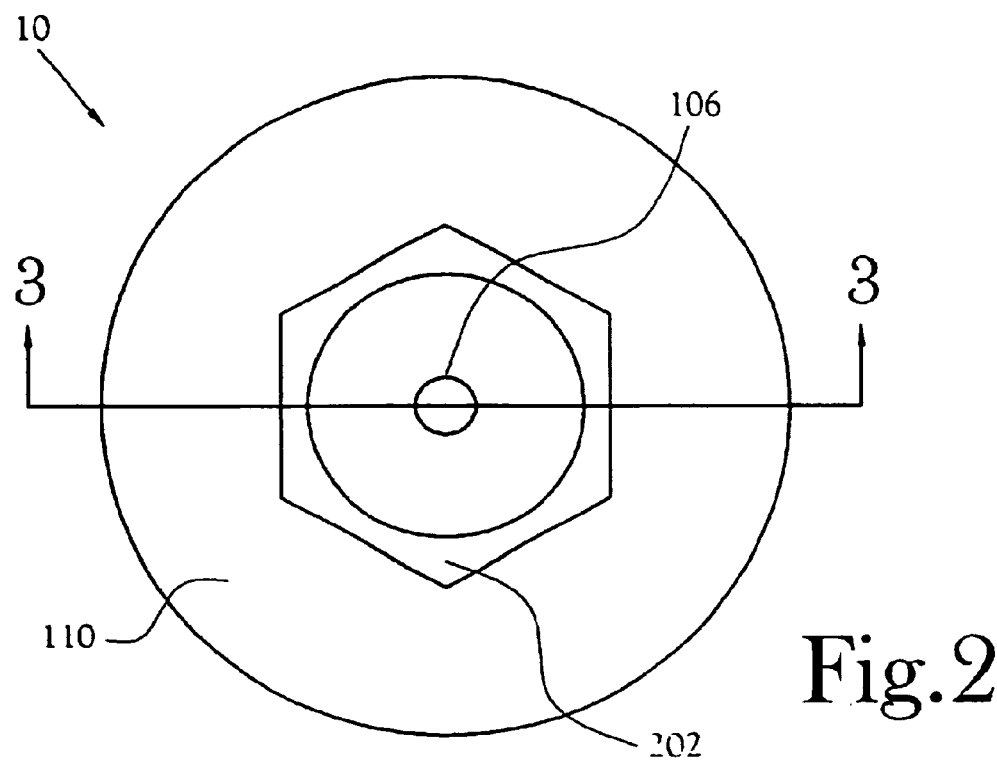
FIG. 2 is a top plan view of the insulated probe.
Figure 3:
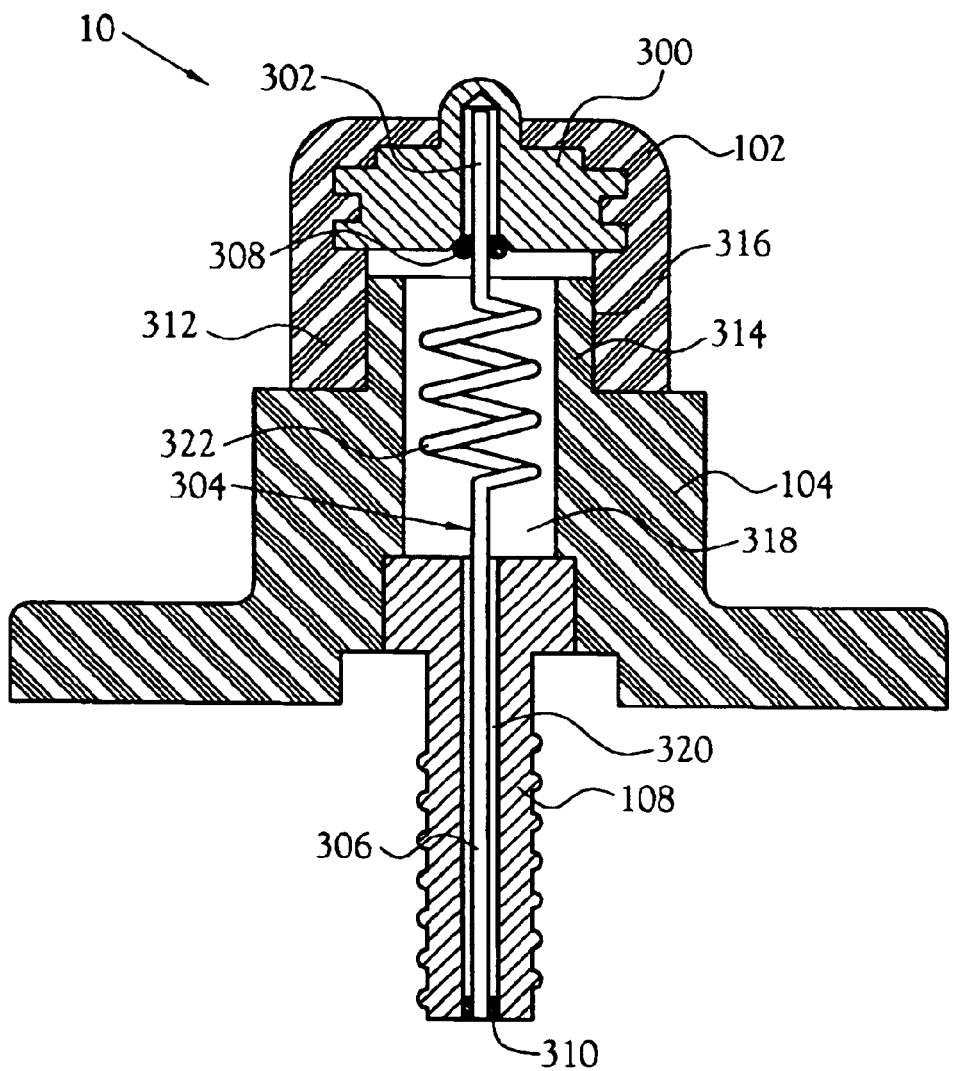
FIG. 3 is a side elevation cross-section of the insulated probe, taken at Section 3—3 of FIG. 2.

FIG. 2 illustrates a top plan view of the insulated probe shown in FIG. 1, showing where section 3—3 is taken for FIG. 3. The barrel 104 defines a hexagonal area 202 adapted to cooperate with a wrench or socket driver for securing the insulated probe 10 to the receiver unit (not shown). The hexagonal area 202 is exemplary of one conventional design for tightly securing two cooperating threaded members. Those skilled in the art will recognize other configurations for tightly securing the insulated probe to the receiver unit without departing from the scope and spirit of the present invention.

FIG. 3 illustrates a sectional view of the insulated probe 10 clearly showing the internal configuration. The insulated probe 10 includes a non-elongated electrode 300, i.e., an electrode having a diameter that is greater than its height, disposed within the cap 102. The cap 102 is adapted to securely receive the electrode 300. The barrel 104 is adapted to securely receive the mounting stud 108. Typically, the electrode 300 is molded into the cap 102 and the mounting stud 108 is molded into the barrel 104. The mounting stud 108 and the electrode 300 are electrically connected by a conductor 304. A first connector 308 secures the conductor first end 302 and the electrode 300. Similarly, a second connector 310 connects the conductor second end 306 and the mounting stud 108. In the illustrated embodiment, the first and second connectors 308, 310 are solder joints electrically and mechanically securing the conductor 304 to the electrode 300 and the mounting stud 108. Those skilled in the art will recognize that other types of connectors can be used to achieve the electrical and mechanical interconnection between the conductor 304 and either of the electrode 300 and the mounting stud 108. For example, the conductor can be secured using a wire nut type threaded arrangement or be mechanically secured using a non-electrically conductive epoxy and another mechanism known to those skilled in the art for creating an electrical interconnection. In the illustrated embodiment, the conductor 304 is a coiled wire; however, those skilled in the art will recognize that the conductor 304 need not be flexible. The design requires that the conductor 304 have an adjustable length, such as is provided by a rigid multi-part telescoping conductor.

The insulated probe 10 is constructed in two pieces that are fastened together using processes commonly known to those skilled in the art based upon the materials used in their fabrication. In the illustrated embodiment, a permanent bond, such as a solvent weld of a plastic cap 102 and a plastic barrel 104. In the illustrated embodiment, the open end of the cap 102 defines a rim 312 that overlaps a wall portion 314 defined by the barrel 104. The mating surfaces of the rim 312 and the wall portion 314 are connected by a solvent weld 316. The length of the upper section 102, the barrel 104, or both can be varied to change the overall length of the insulated probe 10. Alternatively, a friction fit, a locking tab arrangement, a threaded arrangement, or other connecting mechanism known to those skilled in the art can be used to secure the cap 102 to the barrel 104. Those skilled in the art will recognize that the temporary bonds can be used to create consumer resizable probes. For example, the threaded arrangement can include a number of stops that allow the consumer to tighten or loosen the cap until the desired length of the insulated probe is reached.

The barrel 104 defines a central through-opening 318 running axially through the insulated probe 10. A central passage runs axially through the mounting stud 108. The through-opening 318 and the passage 320 cooperate to form a channel in which the conductor 304 resides. As previously described, the conductor 304 is a flexible wire that is electrically connected to the mounting stud 108 by the solder joint 310. The wire 304 extends out of the mounting stud 108 and into the through opening 318, where a coiled portion 322 of excess wire is held. The coiled portion 322 negates the need for conductors 304 of differing lengths when manufacturing and assembling different sized insulated probes 10. Those skilled in the art will recognize that the shape and dimensions of the through-opening are selected to provide sufficient storage space for the coiled portion 322 of the conductor 304. Further, those skilled in the art will recognize that the excess wire need not be coiled to achieve the intended manufacturing purpose of the expanding conductor 304.

Figure 4:
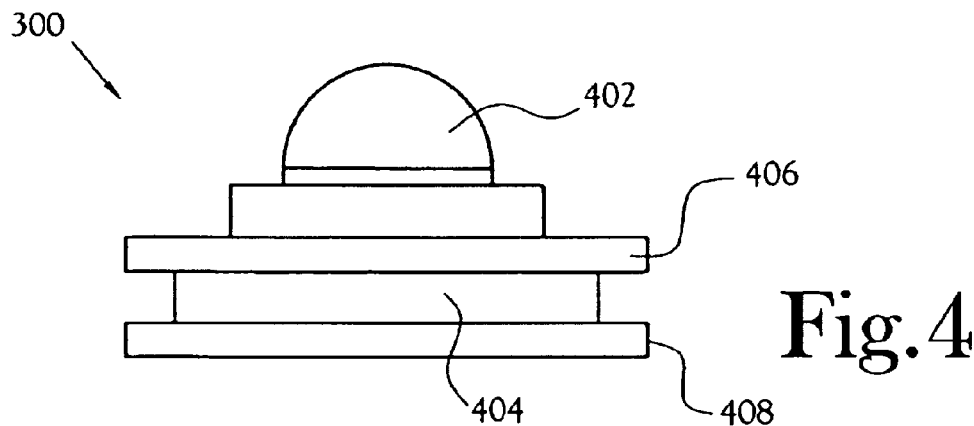
FIG. 4 is a side elevation view of the non-elongated probe tip.
Figure 5:
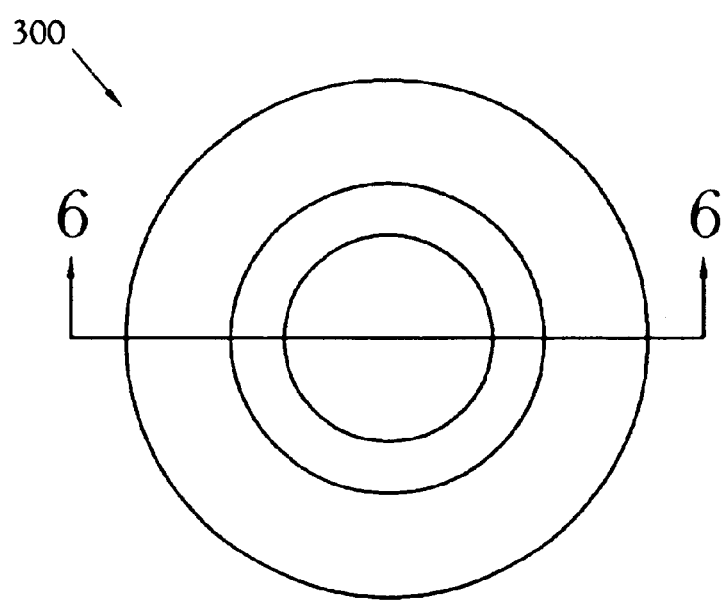
FIG. 5 is a top plan view of the non-elongated probe tip.
Figure 6:
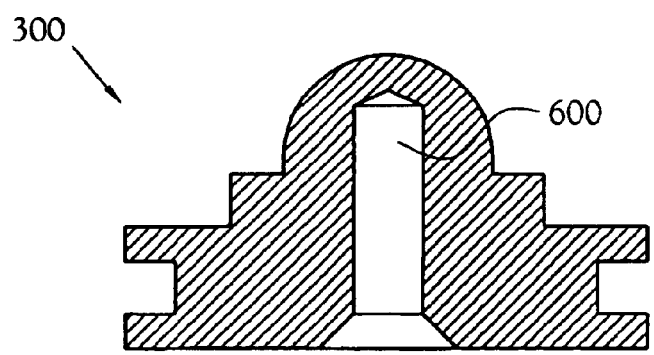
FIG. 6 is a vertical cross-sectional view of the non-elongated probe tip, taken at Section 6—6 of FIG. 5.

FIG. 4 illustrates one embodiment of the electrode 300. The electrode 300 is fabricated from an electrically conductive material and includes a tip 402 supported by a base 404. In the illustrated embodiment, the upper portion of the tip 402 which is intended to make contact with the animal's skin, is hemispherical for comfort and safety. Further, one embodiment of the electrode tip 402 has a diameter of less than 0.125 inches. The base 404 is adapted to cooperate with and engage the cap 102 in a secure manner. In the illustrated embodiment, the base 404 includes a pair of annular projections 406, 408 adapted to be received within a corresponding pair of channels in the cap 102. Those skilled in the art will recognize that the shape of the tip and the base and the mounting adaptations can vary without departing from the scope and spirit of the present invention. FIG. 6 illustrates a cross section of the electrode 300 at section 6—6 of FIG. 5. The electrode 300 defines a slot 600 adapted to receive the conductor 304.

From the foregoing description, it will be recognized by those skilled in the art that an insulated probe has been provided that, in the foregoing embodiment, significantly reduces the amount of electrical shunting that takes place across the wet fur of an animal being trained and is easily resizable during manufacturing.

While the present invention has been illustrated by description of several embodiments and while the illustrative embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An insulated probe for use with an electronic animal training apparatus, said insulated probe comprising:
    an electrically non-conductive housing member;
    a mounting stud adapted to cooperate with said housing member, said mounting stud being electrically conductive, said mounting stud extending from one end of said housing member;
    an electrically non-conductive cap, said cap adapted to attach to said housing member opposite said mounting stud;
    an electrode adapted to be cooperate with said cap, said electrode being electrically conductive, said electrode defining a tip extending from one end of said cap opposite said housing member; and
    a conductor electrically connecting said mounting stud and said electrode, said conductor including a portion of excess wire located within said housing member, said excess wire being extendable to accommodate varying distances between said mounting stud and said electrode.

2. The insulated probe of claim 1 wherein said electrode tip has a diameter of less than 0.125 inches.

3. The insulated probe of claim 1 wherein said electrode has a diameter and a height, said electrode diameter being greater than said electrode height.

4. The insulated probe of claim 1 wherein said portion of excess wire is coiled and deformable in a longitudinal direction.

5. An insulated probe for use with an electronic animal training apparatus, said insulated probe comprising:
    a housing having a barrel and a cap, said barrel and said cap being fabricated from an electrically insulating material;
    a mounting stud molded into said barrel; said mounting stud being electrically conductive, said mounting stud including an extension projecting from an opening in one end of said barrel;
    an electrode molded into said cap, said electrode being electrically conductive, said electrode defining a tip extending through an opening in said cap, said cap being connected to said barrel; and
    a conductor electrically connecting said mounting stud and said electrode, said conductor including a portion of excess wire located within said barrel, said excess wire being extendable to accommodate varying distances between said mounting stud and said electrode.

6. The insulated probe of claim 5 wherein said electrode tip has a diameter of less than 0.125 inches.

7. The insulated probe of claim 5 wherein said electrode has a diameter and a height, said electrode diameter being greater than said electrode height.

8. The insulated probe of claim 5 wherein said portion of excess wire is coiled and deformable in a longitudinal direction.

9. An insulated probe for use with an electronic animal training apparatus, said insulated probe comprising:
    a housing having a barrel and a cap, said barrel and said cap being fabricated from an electrically insulating material, said barrel defining a central through-opening, said cap engaging said barrel in a mating relationship;
    a mounting stud molded into said barrel, said mounting stud being electrically conductive, said mounting stud including a threaded extension projecting from an opening in one end of said barrel;
    an electrode molded into said cap, said electrode being electrically conductive, said electrode defining a tip extending through an opening in said cap, said cap being connected to said barrel; and
    a conductor electrically connecting said mounting stud and said electrode, said conductor being a flexible wire with excess wire stored within said through-opening defined by said barrel, said excess wire extending to accommodate different distances between said mounting stud and said electrode.

10. The insulated probe of claim 9 wherein said electrode tip has a diameter of less than 0.125 inches.

11. The insulated probe of claim 9 wherein said electrode has a diameter and a height, said electrode diameter being greater than said electrode height.

12. The insulated probe of claim 9 wherein said portion of excess wire is coiled and deformable in a longitudinal direction.

13. An insulated probe for use with an electronic animal training apparatus, said insulated probe comprising:
    a housing having a barrel and a cap, said barrel and said cap being fabricated from an electrically insulating material, said barrel defining a central trough-opening, said barrel having an elongated wall portion terminating at a shoulder, said cap including a rim sized to fit over said elongated wall portion of said barrel and rest against said shoulder of said barrel, said cap secured to said barrel;
    a mounting stud secured within said barrel, said mounting stud being electrically conductive, said mounting stud including a threaded extension projecting from an opening in one end of said barrel;
    an electrode molded into said cap, said electrode being electrically conductive, said electrode defining a tip extending through an opening in said cap, said cap being connected to said barrel; and
    a conductor electrically connecting said mounting stud and said electrode, said conductor being a flexible wire with excess wire stored within said opening defined by said barrel, said excess wire extending to accommodate different distances between said mounting stud and said electrode.

14. The insulated probe of claim 13 wherein said electrode tip has a diameter of less than 0.125 inches.

15. The insulated probe of claim 13 wherein said electrode has a diameter and a height, said electrode diameter being greater than said electrode height.

16. The insulated probe of claim 13 wherein said portion of excess wire is coiled and deformable in a longitudinal direction.

* * * * *